US005659889A

United States Patent [19]

Cockson

[11] Patent Number: 5,659,889
[45] Date of Patent: Aug. 19, 1997

[54] RADIO WITH ANTENNA CONNECTOR HAVING HIGH AND LOW IMPEDANCE POINTS

[75] Inventor: Mark G. Cockson, Lincoln, Nebr.

[73] Assignee: Centurion International, Inc., Lincoln, Nebr.

[21] Appl. No.: 368,558

[22] Filed: Jan. 4, 1995

[51] Int. Cl.$^6$ ................................................. H04B 01/38
[52] U.S. Cl. ................ 455/575; 455/129; 455/280; 455/97; 439/218; 439/916; 343/702; 343/906; 343/860
[58] Field of Search ................... 455/89, 90, 351, 455/129, 97, 280, 226.1, 290–92; 343/702, 888, 9, 900, 901, 749, 722, 906, 860; 439/218, 578, 675, 916

[56] References Cited

U.S. PATENT DOCUMENTS

| | | | |
|---|---|---|---|
| 5,245,350 | 9/1993 | Sroka | 343/901 X |
| 5,353,036 | 10/1994 | Baldry | 343/702 |
| 5,526,605 | 5/1996 | Koike | 343/702 |

*Primary Examiner*—Reinhard J. Eisenzopf
*Assistant Examiner*—Philip J. Sobutka
*Attorney, Agent, or Firm*—Zarley, McKee, Thomte, Voorhees & Sease; Dennis L. Thomte

[57] ABSTRACT

A radio transceiver of the present invention includes a transmission line within a housing. The transmission line is comprised of a hollow center conductor and an outer conductor, both connected to a transceiver circuit. The transmission line is also connected to a low impedance connector which is coupled to the housing. A retractable ½ wave antenna having an integral matching section will be matched to a transceiver circuit when extended. When the antenna is retracted, the antenna is retracted within the center conductor and acts as a ¼ wave antenna and will still be matched to the transceiver circuit.

2 Claims, 4 Drawing Sheets

RADIO WITH ANTENNA CONNECTOR HAVING HIGH AND LOW IMPEDANCE POINTS

BACKGROUND OF THE INVENTION

1. Field of the Invention

The present invention relates to portable communications equipment that utilizes retractable or fixed antennas. More particularly the present invention relates to a transceiver device compatible with both high impedance and low impedance connections without having a matching circuit or switching means included within the device.

2. Problems in the Art

Many devices such as cellular telephones use a retractable ½ wave antenna. This antenna has a high impedance and requires the use of a matching circuit when connected to the transmitter to provide the maximum energy transfer to the antenna. In some prior art devices, the manufacturers add additional space to the device which is required in order to fit in a matching circuit section that may be external to the main circuit board. Also, when the output power from the transmitter or the receiver sensitivity is checked by connecting the device to testing equipment, the high impedance matching circuit presents a problem. The impedance of most testing equipment is either 50 or 75 ohms and not the high impedance required by the matching circuit (typically 600-2,000 ohms). If the transceiver performance is measured with this impedance mismatch, significant errors in the measurement will result. Many prior art devices overcome these errors by attaching an additional connector, typically coaxial, to a 50 ohm point on the transceiver circuit to provide a test point with accurate information. This solution requires additional coaxial line, a separate connector, and an electrical or mechanical switch to ensure the proper energy transfer from the printed circuit board to the chosen connection. These solutions are not desirable because of the increase in cost and circuit complexity.

Prior art devices using retractable antennas incorporate an internal matching circuit which connects to the antenna assembly to provide the performance of a ½ wave antenna in the extended position. The problem with this feature is that the antenna is matched to the impedance of the transceiver only in the extended position and not in the retracted position. This creates an impedance mismatch that reduces the efficiency of the antenna when it is in the retracted position.

OBJECTS OF THE INVENTION

A general object of the present invention is to provide a retractable ½ wave antenna with an integral matching section.

A further object of the present invention is to provide a transceiver having a low impedance connector for attachment to service equipment and external antennas.

A further object of the present invention is to provide a transceiver having a connector that provides an integral impedance match for high efficiency end-fed ½ wave antennas.

A further object of the present invention is to provide a transceiver having an antenna connector that requires no electrical or mechanical switching inside the transceiver to select the proper impedance as antennas or equipment are interchanged.

A further object of the present invention is to provide a transceiver having an antenna connector that allows for the use of fixed replacement antennas (including ½ wave and ¼ wave) without compromising performance because of an impedance mismatch.

A further object of the present invention is to provide a transceiver having an end-fed ½ wave antenna that incorporates an integral matching section for proper match when extended.

A further object of the present invention is to provide an antenna that bypasses the integral ½ wave matching section for operation as a ¼ wave antenna when retracted.

These as well as other objects of the present invention will become apparent from the following specification and claims.

SUMMARY OF THE INVENTION

A radio transceiver of the present invention includes a transmission line within a housing. The transmission line is comprised of a hollow center conductor and an outer conductor, both connected to a transceiver circuit. The transmission line is also connected to a low impedance connector which is coupled to the housing.

The present invention also includes a retractable antenna which can be coupled to the low impedance connector. The retractable antenna has an extended position and a retracted position. In the extended position, a contact on the antenna makes electrical contact with the center conductor of the transmission line. The contact is connected to an impedance matching circuit within the antenna which matches the antenna with the low impedance connection. In this extended position, the antenna acts as a half-wave antenna.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
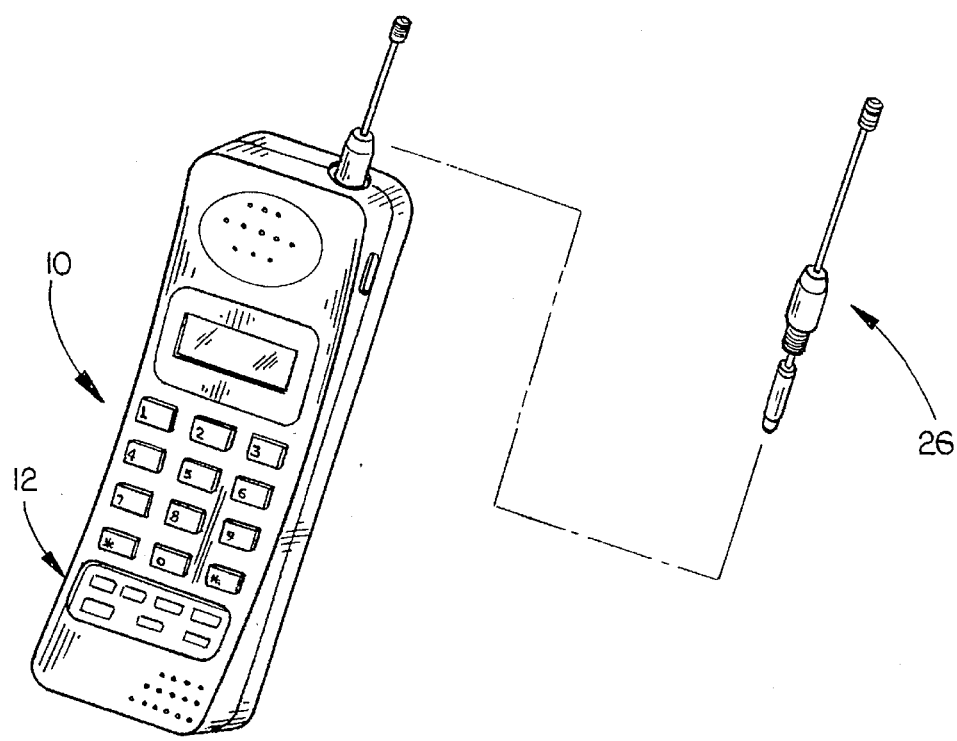
FIG. 1 is a perspective view showing a cellular telephone and an antenna.
Figure 2:
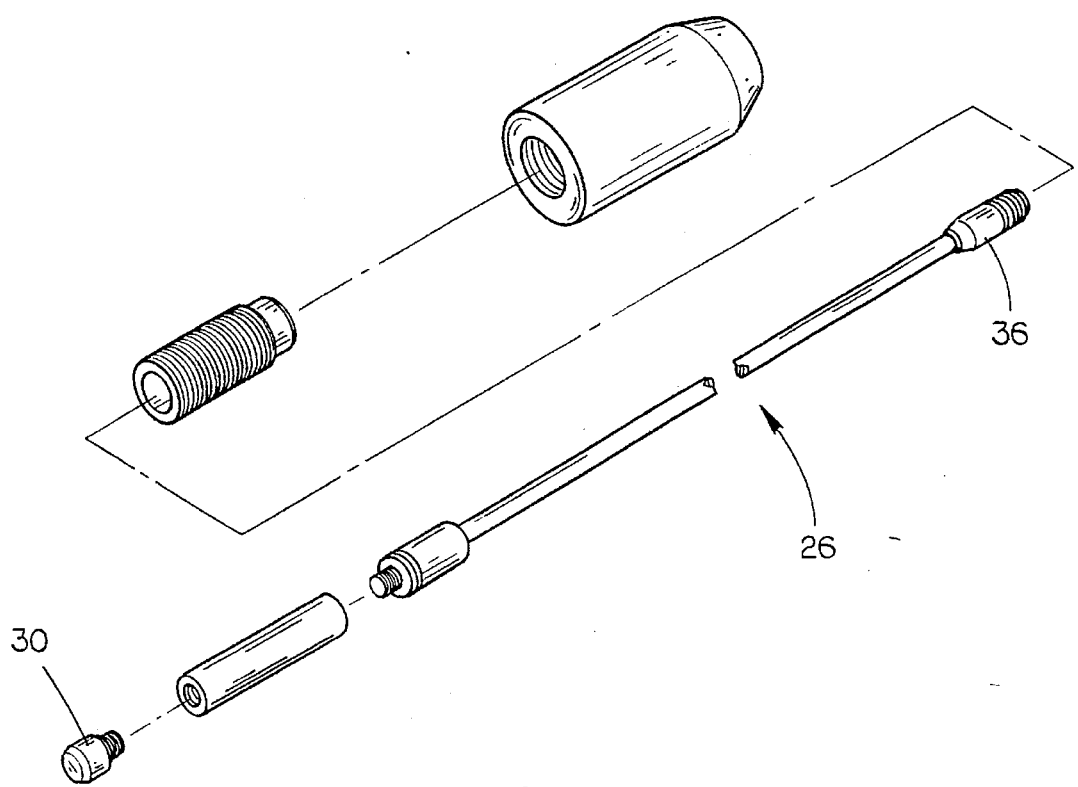
FIG. 2 is an exploded perspective view of an antenna of the present invention.

In its preferred embodiment, the present invention applies to a conventional cellular telephone transceiver. Since the present invention applies to both radio receivers and transmitters, for purposes of this application, the term "transceiver" shall be deemed to include a receiver, a transmitter, or a combination of the two unless otherwise specified. FIG. 1 shows a cellular telephone 10 having a housing 12 and an antenna 26. The antenna 26 is electrically connected to the internal circuitry of the telephone 10 through a connector 14 which threadably receives the antenna 26 as will be described in more detail.

Figure 3:
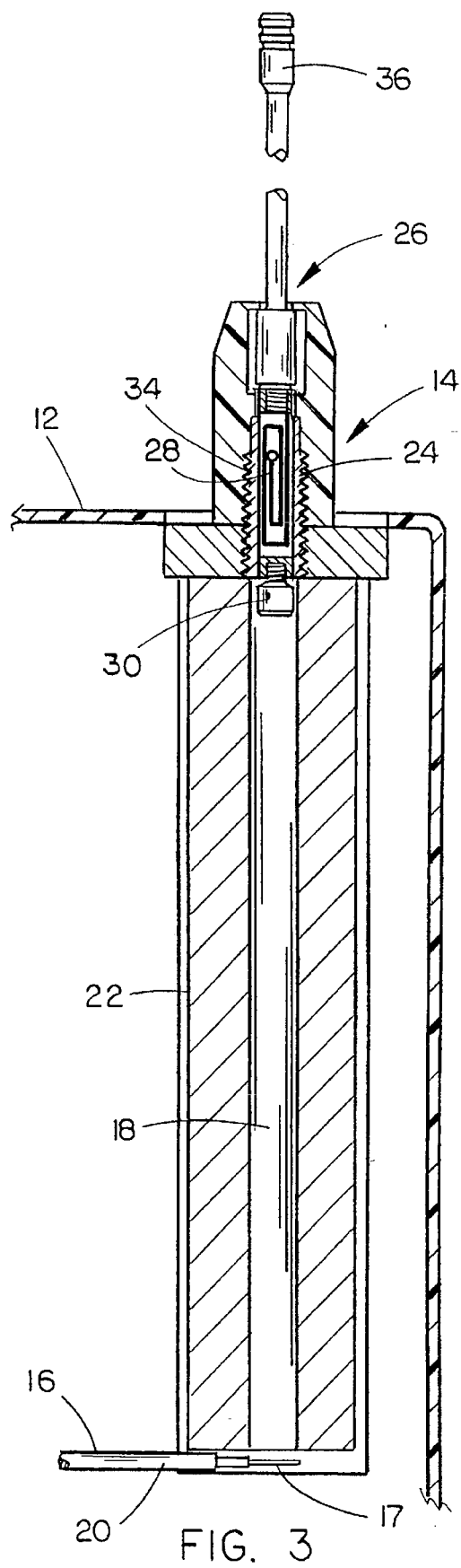
FIG. 3 is a sectional view of a retractable antenna in the extended position.

The connector 14 and integral antenna 26 consist of a 50 ohm coaxial line 16 that terminates in the connector of the invention. FIG. 3 shows a coaxial line 16 having a center conductor 17 that is attached to a center conductor tube 18 of the connector 14. The outer shield 20 of the coaxial line 16 attaches to the outer tube 22 of the connector 14. This forms a 50 ohm transmission line with one end terminated in a threaded connector 24 for attachment to either internal or external 50 ohm antennas as well as external test equipment.

Figure 4:
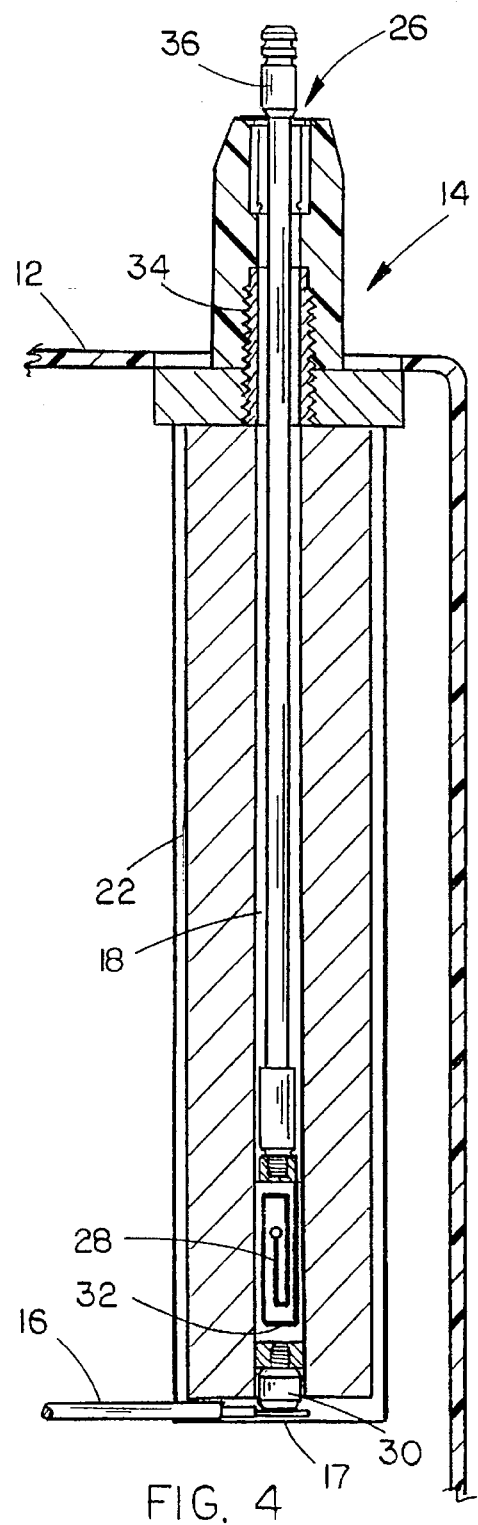
FIG. 4 is a sectional view of a retractable antenna in the retracted position.
Figure 5:
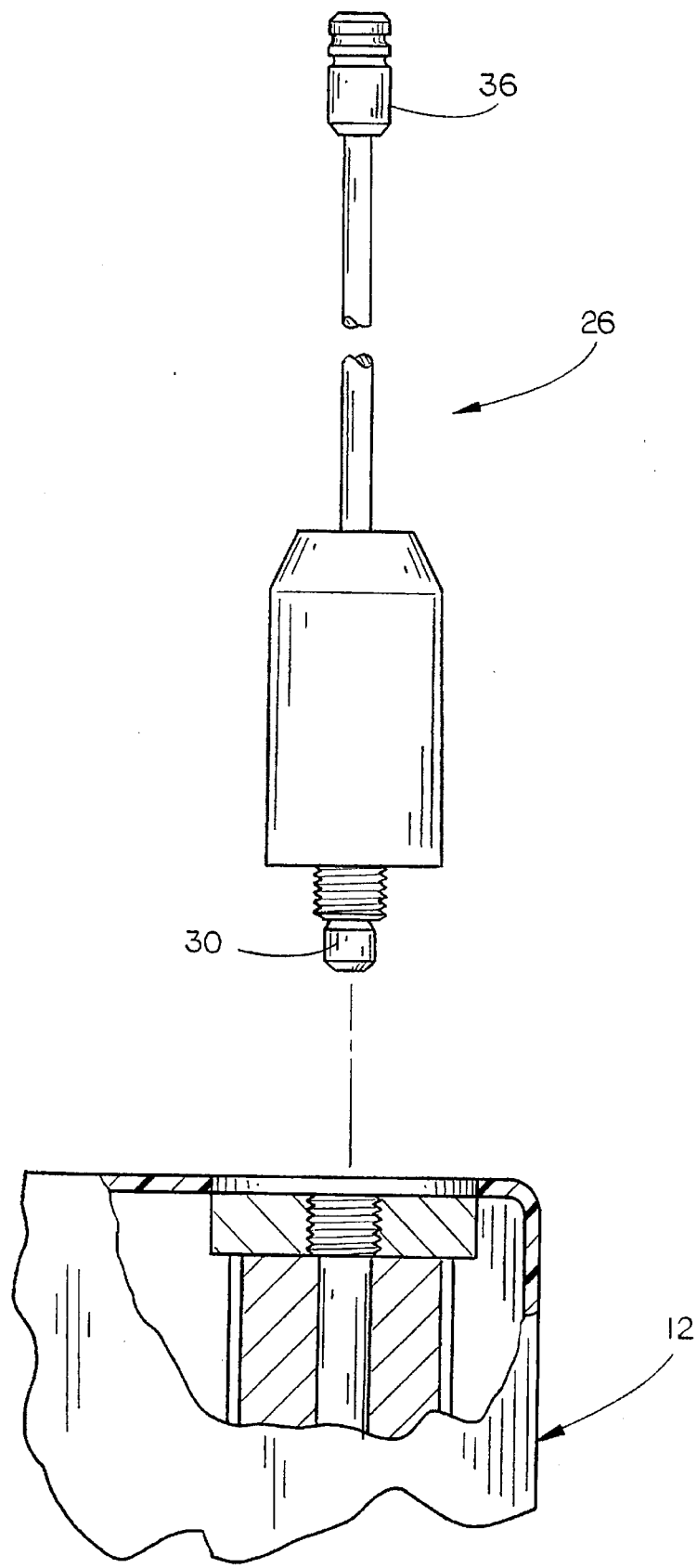
FIG. 5 is a view of the antenna disconnected from the antenna connector.

The transmission line described above can be used with a retractable antenna 26 that has an extended position and a retracted position. In the extended position, the antenna 26 is extended from the housing 12 (FIG. 3) and when retracted, the antenna 26 is retracted within the center tube conductor 18 (FIG. 4). The retractable antenna 26 includes an internal impedance matching section 28 which is connected to the center conductor 18 through contact 30. The impedance matching circuit 28 within antenna 26 allows maximum RF power transfer from the low impedance transmission line to the high impedance antenna 26. In the preferred embodiment, the matching section 28 includes an inductor 32. The inductor 32 can be made from a plated trace on a polymer, a coil inductor, or a printed circuit. The inductor 32 in conjunction with the antenna mount 34 comprises a reactance tuning network that functions as an impedance transformer. This impedance transformer matches the ½ wave antenna to the 50 ohm transmission line as an integrated unit. In operation, the RF signal passes from contact 30 to inductor 32, to the antenna element.

When the antenna 26 is in the retracted position as shown in FIG. 4, the matching circuit 28 including inductor 32 is retracted inside the center conductor 18 of the transmission line. This arrangement forms a highly capacitive coupling which makes antenna 26 effectively look like an extension of the transmission line while antenna 26 is in the retracted position. The upper portion of antenna 26 includes a helical antenna element 36. In the retracted position, the helical antenna element 36 becomes RF coupled to the connector 14. When the antenna element 36 is RF coupled to the connector 14, it can be either electrically connected or electrically separated from the antenna. The helical antenna 36 then acts like a quarter-wave antenna. This antenna is an extension of the transmission line with a capacitive reactive tuning provided by the antenna mount 34.

Therefore, it can be seen that the retractable antenna 26 can be operated in both the fully extended position as well as the fully retracted position without an impedance mismatch associated with prior art connectors which are typically high impedance connectors only.

When the retractable antenna 26 is removed from the cellular telephone 10, it can be replaced with a fixed length quarter-wave flexible antenna. The short quarter-wave flexible antenna has a low impedance and is designed to operate in accordance with the transmission line described above. This facilitates maximum electromagnetic energy transfer from the transmission line to the antenna while providing a small, convenient size for applications where the signal and coverage are sufficient and do not require the superior performance of a longer antenna.

The retractable antenna 28 can also be replaced with a longer more efficient antenna. A ½ wave fixed flexible antenna can be used where the performance of a longer more efficient antenna is required. This antenna will have an integrated matching section manufactured into the antenna mount so that this antenna, as well as the retractable and quarter-wave fixed antennas may be attached directly to the antenna connector 14 of cellular phone 10 without the need for changing the matching, switched impedance, circuitry, or any other undesirable cost increasing options that are found in the prior art.

When it is desired to connect test equipment to the transceiver, the antenna can be easily removed and a coaxial connector can be attached to the transmission line to provide a 50 ohm match to the test equipment. This overcomes one significant disadvantage of prior art devices. Prior art devices provide a retractable antenna connection that is typically matched to a high impedance ½ wave antenna. This requires the addition of an external antenna connector and the increased complexity of the circuitry for adaptation to external antennas and test equipment. If the external connector is not included in prior art devices, then there is a significant impedance mismatch that prevents the device from connecting to test equipment for reliable performance measurements.

Sometimes it is desired to connect a cellular phone to an antenna on the exterior of a automobile. The performance of the reception and transmission of a cellular phone is often impaired when a phone is used within a vehicle. This is caused by the shielding effects of the metal surfaces of the automobile. By connecting the phone to an exterior antenna, the undesirable shielding effects are overcome which improves the performance significantly. For maximum energy transfer and effectiveness of the phone, the antenna should be directly attached to the transceiver. To accomplish this, it is important that the antenna be connected directly to an RF connector which is properly matched to the antenna to provide the optimum energy transfer to the antenna. The connector of the present invention accomplishes this.

Figure 6:
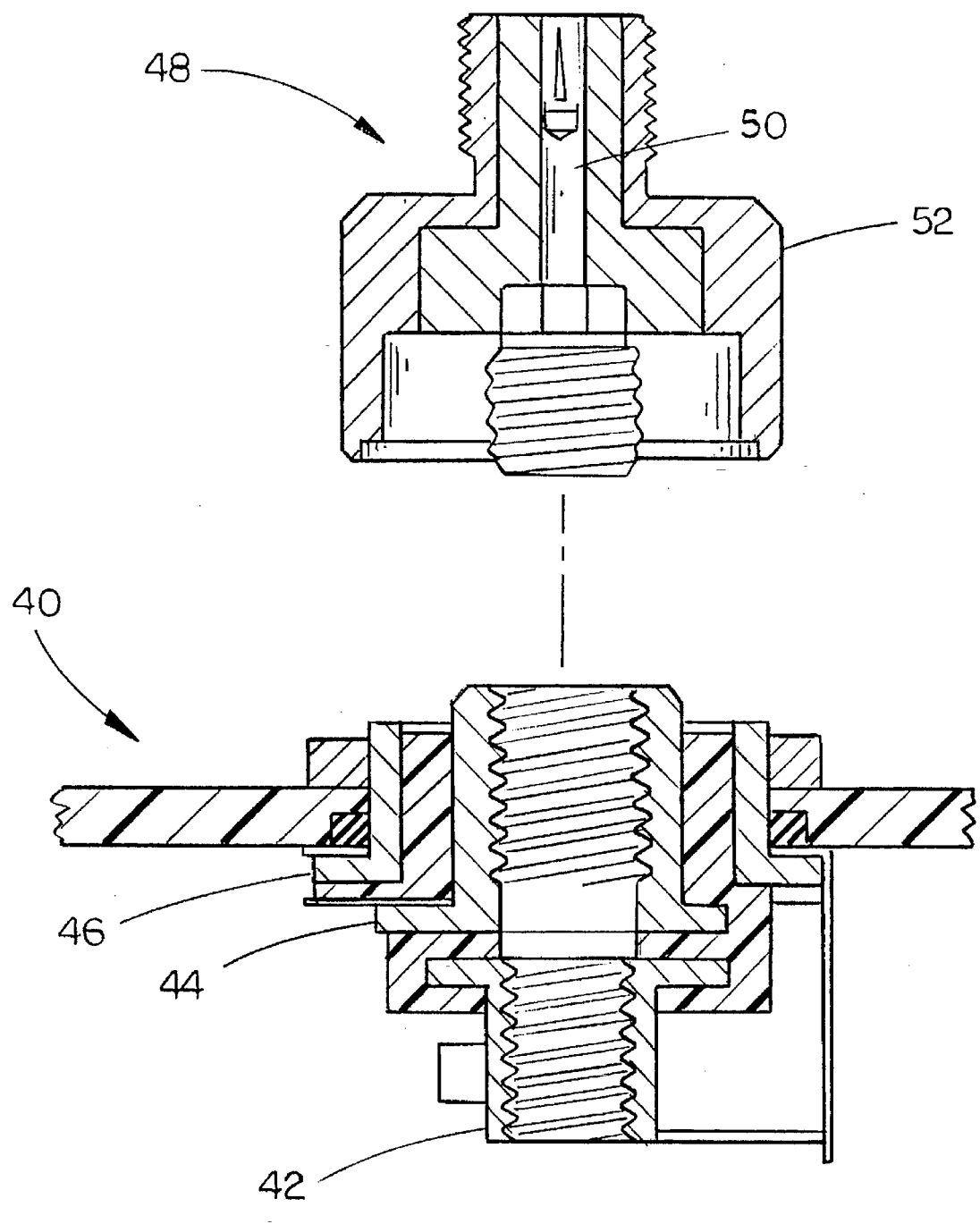
FIG. 6 is a sectional view of an alternative antenna connector and an external coax adapter.

FIG. 6 shows an alternative embodiment of the present invention. A transceiver connector that provides connections for devices having various impedance requirements is shown as connector 40 in FIG. 6. The connector 40 is designed to provide a three conductor connection. The connector 40 is attached to a printed circuit board within a device such as a cellular phone 10 to couple RF energy to an antenna or test equipment.

Conductor 42 in FIG. 6 is connected to a high impedance point on the printed circuit board of the phone 10 through an inductor, forming a high impedance connector. Conductor 42 is round and can have threads on its interior surface for threadably receiving a conductor for an antenna or test equipment.

Conductor 44 is connected to a low impedance (50 ohm) point on the printed circuit board of the phone 10 forming a low impedance connector 44. Conductor 44 is also round and can have a threaded interior surface for threadably receiving a conductor for an antenna or test equipment.

Ground conductor 46 is connected to the chassis ground of the printed circuit board circuitry to form an attachment point for the ground when an external adapter 48 is attached to the device. The capacitive element of the circuit is comprised of the relationship of connections 42, 44, and 46.

When a high impedance antenna is desired, the antenna will be attached to the high impedance connector of the phone 10 through connection 42. Connection 42 is smaller in diameter than section 44, so the high impedance antenna will not make contact with the low impedance connection 44. In this configuration, the current will pass through connection 42 and into the end-fed ½ wave high impedance antenna and is then radiated into space.

When a low impedance antenna is desired, the low impedance antenna will be connected to telephone 10 through the low impedance connection 44. The antenna will not make contact with the high impedance connection 42. This provides optimum energy transfer when a low impedance quarter-wave is connected to the connector 40.

When it is desired to connect test equipment or an external antenna to the phone 10, an external adapter 48 is attached to the connector 40 of the phone 10. The low impedance connection 44 will be connected to a center conductor 50 of the adapter 48 to provide a 50 ohm connection point to the center conductor 50 of the test equipment or external antenna. The ground connection 46 is connected to the external adapter ground 52 to provide the ground for the coaxial adapter 48.

The connections 42 and 44 are both hollow to provide clearance for use with a retractable antenna. So, like the embodiment described in FIGS. 1–5, the embodiment of FIG. 6 accomplishes the objectives of the present invention.

The preferred embodiment of the present invention has been set forth in the drawings and specification, and although specific terms are employed, these are used in a generic or descriptive sense only and not used for purposes of limitation. Changes in the form and proportion of parts as well as in the substitution of equivalents are contemplated as circumstances may suggest or render expedient without departing from the spirit or scope of the invention as further defined in the following claims.

What is claimed is:

1. An antenna connector for use with a radio having high and low impedance points comprising:

a first conductor coupled to a ground forming an attachment point for the ground at said connector;

a second conductor coupled to a first impedance point of said radio, said second conductor being hollow, said second conductor having a first diameter; and a third conductor coupled to a second impedance point of said radio, said third conductor being hollow, said third conductor having a second diameter, said second diameter being smaller than said first diameter, said third conductor and said second conductor being disposed proximate each other in a co-axial relationship wherein an external center conductor may be coupled to either of said second or third conductors depending on the diameter of said external center conductor, said second and third conductors being arranged such that a retractable antenna may be slidably received through said second and third connectors.

2. The antenna connector of claim 1 further comprising an external coaxial adapter coupled to said connector, said coaxial adapter having a ground coupled to said first conductor, said coaxial adapter having a center conductor coupled to said second or third conductor of said antenna connector.

* * * * *